(12) United States Patent
Kashyap

(10) Patent No.: US 12,153,616 B2
(45) Date of Patent: Nov. 26, 2024

(54) COMPUTER-IMPLEMENTED VISUAL QUERY MATCHING METHODS, AND SYSTEMS FOR IMPLEMENTING THEREOF

(71) Applicant: TANAR Corp., Toronto (CA)

(72) Inventor: Arun Kashyap, Mississauga (CA)

(73) Assignee: TANAR Corp., Toronto (CA)

( * ) Notice: Subject to any disclaimer, the term of this patent is extended or adjusted under 35 U.S.C. 154(b) by 0 days.

(21) Appl. No.: 18/533,795

(22) Filed: Dec. 8, 2023

(65) Prior Publication Data

US 2024/0176810 A1 May 30, 2024

Related U.S. Application Data

(63) Continuation of application No. 17/945,551, filed on Sep. 15, 2022, now Pat. No. 11,886,485.

(51) Int. Cl.
G06F 16/00 (2019.01)
G06F 16/438 (2019.01)

(52) U.S. Cl.
CPC ................... *G06F 16/438* (2019.01)

(58) Field of Classification Search
CPC ........................................... G06F 16/438
See application file for complete search history.

(56) References Cited

U.S. PATENT DOCUMENTS

| | | |
|---|---|---|
| 8,271,516 B2 | 9/2012 | Gounares et al. |
| 9,633,074 B1 | 4/2017 | Sharma et al. |
| 2002/0046187 A1 | 4/2002 | Vargas et al. |
| 2002/0087450 A1 | 7/2002 | Reddy |
| 2011/0289010 A1 | 11/2011 | Rankin, Jr. et al. |
| 2013/0138462 A1 | 5/2013 | Love, Jr. et al. |
| 2016/0103862 A1 | 4/2016 | Boe et al. |
| 2016/0140168 A1 | 5/2016 | Rankin, Jr. et al. |
| 2017/0185676 A1 | 6/2017 | Tal-Israel |
| 2019/0087859 A1 | 3/2019 | Fatemi |
| 2021/0342337 A1 | 11/2021 | Lu et al. |
| 2022/0179993 A1 | 6/2022 | Vax et al. |

FOREIGN PATENT DOCUMENTS

| | | |
|---|---|---|
| TW | 201447786 A | 12/2014 |
| TW | 201602890 A | 1/2016 |

OTHER PUBLICATIONS

International Search Report (ISR) and Written Opinion (WO) mailed May 24, 2023 in PCT/CA2022/051391.

*Primary Examiner* — Ajith Jacob

(57) ABSTRACT

The embodiments described herein are directed to computer-implemented visual query matching methods and systems for implementing thereof. An example method includes storing first query data including queries associated with a first set of users, wherein each query includes selected criteria from multiple query criteria and first filter data for the multiple query criteria; storing second query data including metadata and queries associated with a second set of users, wherein each query includes selected criteria from the multiple query criteria and second filter data for the multiple query criteria; determining, by a processor, matching users from the second set of users for a first user of the first set of users; and providing, by the processor to the first user, a dashboard display including a matrix of the matching users.

18 Claims, 9 Drawing Sheets

COMPUTER-IMPLEMENTED VISUAL QUERY MATCHING METHODS, AND SYSTEMS FOR IMPLEMENTING THEREOF

CROSS-REFERENCE TO RELATED APPLICATIONS

This application is a continuation of U.S. patent application Ser. No. 17/945,551, filed on Sep. 15, 2022. The complete disclosure of U.S. patent application Ser. No. 17/945,551 is incorporated herein by reference.

FIELD

The described embodiments relate to computer-implemented visual query matching methods, and systems for implementing thereof.

BACKGROUND

Modern computing technologies enable large amounts of data to be stored in databases. For example, a research publication database may store large amounts of data related to research publications, a products database associated with an e-commerce website may store large amounts of data related to different products, and a transaction opportunities database may store large amounts of data related to available transaction opportunities. The large amount of data available can make searching and retrieval of data challenging and time-consuming.

The database may include a query system that enables a user to query the database and search for specific information. A user may specify one or more search criteria when querying the database. Depending on the data stored in the database and the specified search criteria, a large number of search results may be generated in response to the user query. The search results may match one or more of the specified search criteria. The query system needs to be efficient to present a large number of search results meeting different search criteria to the user.

SUMMARY

The various embodiments described herein generally relate to computer-implemented visual query matching methods (and associated systems configured to implement the methods).

In accordance with an example embodiment, there is provided a computer-implemented visual query matching method involving: storing first query data including queries associated with a first set of users, wherein each query includes selected criteria from multiple query criteria and first filter data for the multiple query criteria; storing second query data including metadata and queries associated with a second set of users, wherein each query includes selected criteria from the multiple query criteria and second filter data for the multiple query criteria; determining, by a processor, matching users from the second set of users for a first user of the first set of users by comparing the first filter data for the selected criteria of a first query associated with the first user, with the metadata and the second filter data included in the second query data; and providing, by the processor to the first user, a dashboard display including a matrix of the matching users, the matrix organized by a number of matching criteria among the selected criteria of the first query for each matching user.

In some embodiments, the method further includes storing object data corresponding to the multiple criteria for a first object associated with the first user; determining, by the processor, matching queries among the queries associated with the second set of users by comparing the object data for the first object with the second filter data for the selected criteria of the queries associated with the second set of users; and providing, by the processor to the first user, the dashboard display including a matrix of the matching queries, the matrix organized by the number of matching criteria among the selected criteria of the matching queries.

In some embodiments, the second query data includes multiple queries associated with a single user for one or more users of the second set of users, wherein any one query of the multiple queries is designated as a primary query for each of the second set of users; and the processor determines matching users from the second set of users for a first user of the first set of users by comparing the first filter data for the selected criteria of the first query associated with the first user, with the metadata, and the second filter data of the primary query for each of the second set of users.

In some embodiments, the method further includes determining, by the processor, whether the matching users is different in response to detecting a change in one or more of the first query data and the second query data; and in response to determining the matching users is different, operating the processor to update the dashboard display to indicate the matching users has changed.

In some embodiments, the change in one or more of the first query data and the second query data includes a new user added to the second set of users, and the method further includes: updating the second query data with new metadata and new queries associated with the new user; and operating the processor to update the dashboard display to indicate the matching users has changed includes displaying a new user indicator on the dashboard display to indicate that the matching users includes a new matching user.

In some embodiments, the method further includes determining, by the processor, whether the matching queries is different in response to detecting a change in one or more of the first query data, the second query data, and the object data; and in response to determining the matching queries is different, operating the processor to update the dashboard display to indicate the matching queries has changed.

In some embodiments, the multiple criteria include a set of ten criteria and the selected criteria includes five criteria selected from the set of ten criteria.

In some embodiments, the method further includes providing, by the processor, a communication interface between the first user and any of the matching users from the second set of users based on a user status of the first user.

In some embodiments, the first query data includes one or more queries associated with the first user and the dashboard display provided to the first user includes the matrix of the matching users displayed in a first table, each row of the first table corresponding to a given query of the one or more queries associated with the first user and a number of columns of the first table corresponding to a number of the selected criteria for the one or more queries associated with the first user.

In some embodiments, the matching users are displayed in the columns of the first table ordered according to the number of matching criteria among the selected criteria for the given query of the one or more queries associated with the first user.

In some embodiments, the dashboard display provided to the first user includes the matrix of the matching queries displayed in a second table, wherein each row of the second table corresponds to an object associated with the first user and a number of columns of the second table corresponds to a number of the selected criteria of the matching queries.

In some embodiments, the matching queries are displayed in the columns of the second table ordered according to the number of matching criteria among the selected criteria of the matching queries.

In accordance with another example embodiment, there is provided a system for visual query matching. The system includes a memory unit and a processor. The memory unit is configured to: store first query data including queries associated with a first set of users, wherein each query includes selected criteria from multiple query criteria and first filter data for the multiple query criteria; and store second query data including metadata and queries associated with a second set of users, wherein each query includes selected criteria from the multiple query criteria and second filter data for the multiple query criteria. The processor is configured to: determine matching users from the second set of users for a first user of the first set of users by comparing the first filter data for the selected criteria of a first query associated with the first user, with the metadata and the second filter data included in the second query data; and provide, to the first user, a dashboard display including a matrix of the matching users, the matrix organized by a number of matching criteria among the selected criteria of the first query for each matching user.

In some embodiments, the memory unit is further configured to store object data corresponding to the multiple criteria for a first object associated with the first user; and the processor is further configured to: determine matching queries among the queries associated with the second set of users by comparing the object data for the first object with the second filter data for the selected criteria of the queries associated with the second set of users; and provide, to the first user, the dashboard display including a matrix of the matching queries, the matrix organized by the number of matching criteria among the selected criteria of the matching queries.

In some embodiments, the second query data includes multiple queries associated with a single user for one or more users of the second set of users, wherein any one query of the multiple queries is designated as a primary query for each of the second set of users; and the processor is configured to determine matching users from the second set of users for a first user of the first set of users by comparing the first filter data for the selected criteria of the first query associated with the first user, with the metadata, and the second filter data of the primary query for each of the second set of users.

In some embodiments, the processor is further configured to: determine whether the matching users is different in response to detecting a change in one or more of the first query data and the second query data; and in response to determining the matching users is different, update the dashboard display to indicate the matching users has changed.

In some embodiments, the change in one or more of the first query data and the second query data includes a new user added to the second set of users, wherein the memory unit is further configured to store updated second query data that includes new metadata and new queries associated with the new user; and the processor being configured to update the dashboard display to indicate the matching users has changed includes displaying a new user indicator on the dashboard display to indicate that the matching users include a new matching user.

In some embodiments, the processor is further configured to: determine whether the matching queries is different in response to detecting a change in one or more of the first query data, the second query data, and the object data; and in response to determining the matching queries is different, update the dashboard display to indicate the matching queries has changed.

In some embodiments, the multiple criteria include a set of ten criteria and the selected criteria includes five criteria selected from the set of ten criteria.

In some embodiments, the processor is further configured to provide a communication interface between the first user and any of the matching users from the second set of users based on a user status of the first user.

In some embodiments, the first query data includes one or more queries associated with the first user and the dashboard display provided to the first user includes the matrix of the matching users displayed in a first table, each row of the first table corresponding to a given query of the one or more queries associated with the first user and a number of columns of the first table corresponding to a number of the selected criteria for the one or more queries associated with the first user.

In some embodiments, the matching users are displayed in the columns of the first table ordered according to the number of matching criteria among the selected criteria for the given query of the one or more queries associated with the first user.

In some embodiments, the dashboard display provided to the first user includes the matrix of the matching queries displayed in a second table, wherein each row of the second table corresponds to an object associated with the first user and a number of columns of the second table corresponds to a number of the selected criteria of the matching queries.

In some embodiments, the matching queries are displayed in the columns of the second table ordered according to the number of matching criteria among the selected criteria of the matching queries.

In accordance with another example embodiment, there is provided a computer-implemented visual query matching method involving: storing object data corresponding to multiple query criteria for multiple objects, wherein each of the multiple objects is associated with a user of a first set of users; storing query data including metadata and queries associated with a second set of users, wherein each query includes selected criteria from the multiple query criteria and filter data for the multiple query criteria; determining, by a processor, matching objects from the multiple objects for a first user of the second set of users by comparing the filter data for the selected criteria of a first query associated with the first user and the object data for the multiple objects; and providing, by the processor to the first user, a dashboard display including a matrix of the matching objects, the matrix organized by the number of matching criteria among the selected criteria of the first query for each matching object.

In some embodiments, the stored object data includes a timing parameter for each of the multiple objects, and the matrix of the matching objects includes ordering according to the timing parameter.

In some embodiments, the method further includes determining, by the processor, whether the matching objects is different in response to detecting a change in one or more of the query data and the object data; and in response to determining the matching objects is different, operating the processor to update the dashboard display to indicate the matching objects has changed.

In some embodiments, the change in one or more of the query data and the object data includes a new object added to the multiple objects, and the method further includes: updating the object data with new data associated with the new object; and operating the processor to update the dashboard display to indicate the matching objects has changed includes displaying a new object indicator on the dashboard display to indicate that the matching objects includes a new matching object.

In some embodiments, the multiple criteria are based on properties associated with the multiple objects.

In some embodiments, the multiple criteria include a set of ten criteria and the selected criteria includes five criteria selected from the set of ten criteria.

In some embodiments, the method further includes providing, by the processor, a communication interface between the first user and any user from the first set of users associated with the matching objects based on a user status of the first user.

In some embodiments, the query data includes one or more queries associated with the first user and the dashboard display provided to the first user includes the matrix of the matching objects displayed in a first table, each row of the first table corresponding to a given query of the one or more queries associated with the first user and a number of columns of the first table corresponding to a number of the selected criteria for the one or more queries associated with the first user.

In some embodiments, the matching objects are displayed in the columns of the first table ordered according to the number of matching criteria among the selected criteria for the given query of the one or more queries associated with the first user.

In some embodiments, the dashboard display provided to the first user includes the matrix of the matching objects displayed in a second table, wherein the rows of the second table are ordered according to the timing parameter and a number of columns of the second table corresponds to a number of the selected criteria of the first query.

In some embodiments, the matching objects are displayed in the columns of the second table ordered according to the number of matching criteria among the selected criteria of the first query.

In accordance with another example embodiment, there is provided a system for visual query matching. The system includes a memory unit and a processor. The memory unit is configured to: store object data corresponding to multiple query criteria for multiple objects, wherein each of the multiple objects is associated with a user of a first set of users; and store query data including metadata and queries associated with a second set of users, wherein each query includes selected criteria from the multiple query criteria and filter data for the multiple query criteria. The processor is configured to: determine matching objects from the multiple objects for a first user of the second set of users by comparing the filter data for the selected criteria of a first query associated with the first user and the object data for the multiple objects; and provide, to the first user, a dashboard display including a matrix of the matching objects, the matrix organized by the number of matching criteria among the selected criteria of the first query for each matching object.

In some embodiments, the stored object data includes a timing parameter for each of the multiple objects, and the matrix of the matching objects includes ordering according to the timing parameter.

In some embodiments, the processor is further configured to: determine whether the matching objects is different in response to detecting a change in one or more of the query data and the object data; and in response to determining the matching objects is different, update the dashboard display to indicate the matching objects has changed.

In some embodiments, the change in one or more of the query data and the object data includes a new object added to the multiple objects, wherein the memory unit is further configured to store updated object data that includes new data associated with the new object; and the processor being configured to update the dashboard display to indicate the matching objects has changed includes displaying a new object indicator on the dashboard display to indicate that the matching objects include a new matching object.

In some embodiments, the multiple criteria are based on properties associated with the multiple objects.

In some embodiments, the multiple criteria include a set of ten criteria and the selected criteria includes five criteria selected from the set of ten criteria.

In some embodiments, the processor is further configured to provide a communication interface between the first user and any user from the first set of users associated with the matching objects based on a user status of the first user.

In some embodiments, the query data includes one or more queries associated with the first user and the dashboard display provided to the first user includes the matrix of the matching objects displayed in a first table, each row of the first table corresponding to a given query of the one or more queries associated with the first user and a number of columns of the first table corresponding to a number of the selected criteria for the one or more queries associated with the first user.

In some embodiments, the matching objects are displayed in the columns of the first table ordered according to the number of matching criteria among the selected criteria for the given query of the one or more queries associated with the first user.

In some embodiments, the dashboard display provided to the first user includes the matrix of the matching objects displayed in a second table, wherein the rows of the second table are ordered according to the timing parameter and a number of columns of the second table corresponds to a number of the selected criteria of the first query.

In some embodiments, the matching objects are displayed in the columns of the second table ordered according to the number of matching criteria among the selected criteria of the first query.

BRIEF DESCRIPTION OF THE DRAWINGS

Several embodiments will now be described with reference to the drawings, in which.

Figure 1:
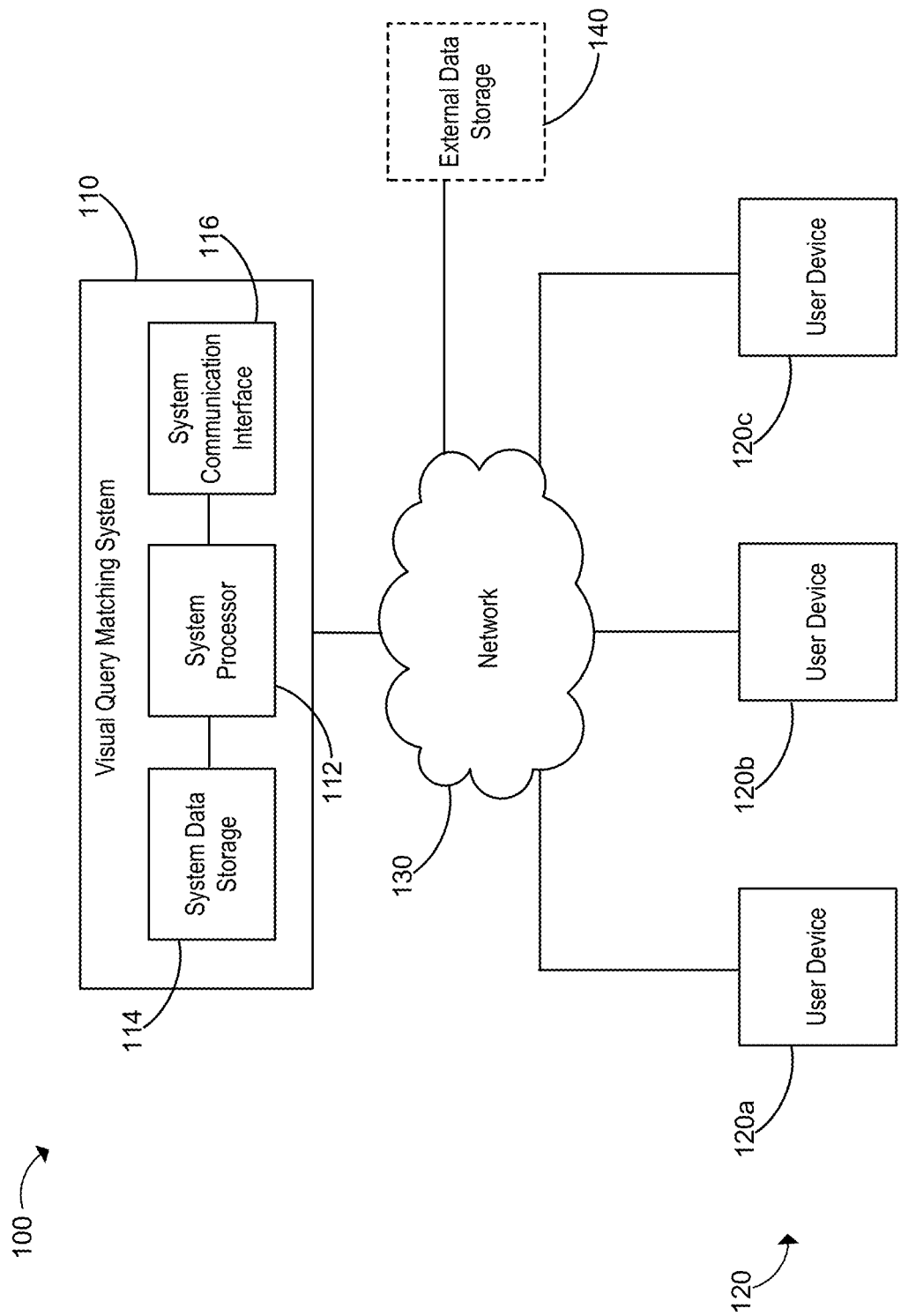
FIG. 1 is a block diagram of a system for visual query matching, in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps

DESCRIPTION OF EXEMPLARY EMBODIMENTS

With databases storing large amounts of data, query systems need to be efficient to present a large number of search results meeting different search criteria in response to a user query. The systems and methods disclosed herein enable a user to build a query by selecting desired query criteria from among multiple criteria. For an example of a research publication database, a user may build a query by selecting "Publication Date", "Author", "Affiliated Institution" and "Key words" from multiple available criteria. Further, the user may provide filter data for each of the selected query criteria. For example, the user may provide "Jan. 1, 2021-Dec. 31, 2021" as the filter data for the "Publication Date" criterion. The disclosed systems and methods can present the generated search results to the user as a dashboard display that includes a matrix of the generated search results. The matrix of search results can be organized based on the number of matching criteria among selected query criteria for each of the search results. This can improve the efficiency of the query system in presenting the search results to the user (compared with, for example, presenting the search results as a list without a clear indication regarding the number of matching criteria for each search result).

The disclosed systems and methods can also improve the efficiency of the query system by dynamically matching users based on the search query data provided by the users. For an example transaction opportunities database, a user providing transaction opportunities for sale may be presented with dynamically matches users searching for transaction opportunities to purchase based on the search query data provided by the users.

The dynamic matching process can be a continuous process that can continuously update the generated matches in response to any changes in the query data provided by the users and/or data stored in the database. This can improve the efficiency of the query system compared with a passive searching process where the query system only generates search results when a query is received and does not use the query data to generate matching results.

Reference is first made to FIG. 1, which shows a block diagram 100 of an example visual query matching system 110 in communication with multiple user devices 120a-120c (also referred to collectively or generically as user device(s) 120) via a network 130. In some embodiments, visual query matching system 110 may also be in communication with an external data storage 140 via network 130.

The visual query matching system 110 includes a system processor 112, a system data storage 114 and a system communication interface 116. The visual query matching system 110 can be implemented with more than one computer server distributed over a wide geographic area and connected via the network 130. The system processor 112, the system data storage 114 and the system communication interface 116 may be combined into fewer components or may be separated into further components. The system processor 112, the system data storage 114 and the system communication interface 116 may be implemented in software or hardware, or a combination of software and hardware.

The system processor 112 can be implemented with any suitable processor, controller, digital signal processor, graphics processing unit, application specific integrated circuits (ASICs), and/or field programmable gate arrays (FPGAs) that can provide sufficient processing power for the configuration, purposes, and requirements of the visual query matching system 110 as will be discussed herein. The system processor 112 can include more than one processor and each processor can be configured to perform different dedicated tasks.

The system communication interface 116 can include any interface that enables the visual query matching system 110 to communicate with various computing devices and other systems. In some embodiments, the system communication interface 116 can include at least one of a serial port, a parallel port or a USB port. For example, the system communication interface 116 can receive data from or transmit data to the user devices 120 and/or the external data storage 140. The system communication interface 116 may include one or more of an Internet, Local Area Network (LAN), Ethernet, Firewire, modem or digital subscriber line connection.

The system data storage 114 can include RAM, ROM, one or more hard drives, one or more flash drives, or some other suitable data storage elements such as disk drives, etc. The system data storage 114 can, for example, include a memory used to store programs and an operating system used by the visual query matching system 110. The system data storage 114 can include one or more databases for storing information related to, but not limited to, queries associated with users of the visual query matching system 110, metadata associated with the users, and object data for objects associated with the users. The information can be stored on one database or separated into multiple databases.

The external data storage 140 can store data similar to that of the system data storage 114, and/or different data. The external data storage 140 can be used as a back-up data storage and/or for storing larger files which can be retrieved or accessed directly via the network 130. The external data storage 140 can, for example, be a network attached storage (NAS) or a cloud storage. The data stored in the external data storage 140 can be accessed by the visual query matching system 110, and/or the user device 120 via the network 130.

The user device 120 can include any networked device operable to connect to the network 130. A networked device is a device capable of communicating with other devices through a network such as the network 130. A networked device may couple to the network 130 through a wired or wireless connection.

The user device 120 can receive an input from a user and communicate with the visual query matching system 110 and/or the external data storage 140 via the network 130. The user device 120 can include at least a processor, a communication interface, and a data storage, and may be an electronic tablet device, a personal computer, workstation, portable computer, mobile device, personal digital assistant, laptop, smart phone, and portable electronic devices or any combination of these. Although only three user devices 120a-120c are illustrated in FIG. 1, four or more user devices 120 can be in communication with the other components illustrated in FIG. 1.

The network 130 can include any network capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these, capable of interfacing with, and enabling communication between, the visual query matching system 110, the user devices 120, and the external data storage 140.

Figure 2:
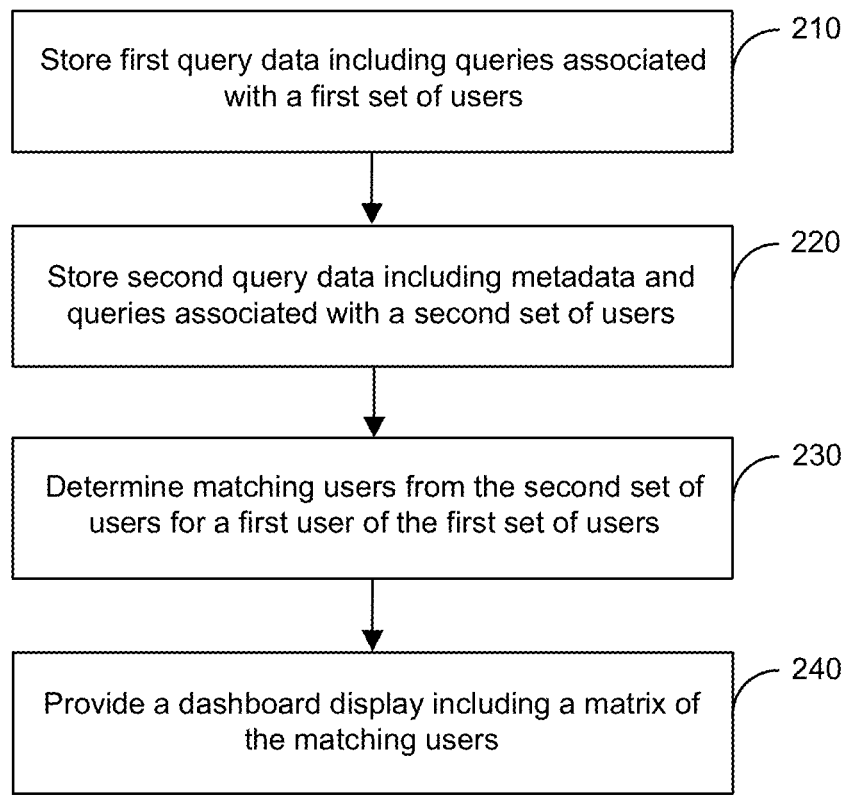
FIG. 2 is a flowchart illustrating the steps of an example method of visual query matching, in accordance with an example embodiment.

Referring to FIG. 2, shown is a flowchart diagram illustrating the steps of a method of visual query matching, shown generally as 200. Method 200 can be implemented using, for example, visual query matching system 110 shown in FIG. 1. To illustrate the steps of the method, reference will be made simultaneously to block diagram 100 and FIGS. 3 to 6 which illustrate various example screenshots of a user interface provided on user devices 120.

Method 200 may be performed at various times. For example, method 200 may be continuously performed by the visual query matching system 110. In other examples, method 200 may be performed according to a schedule stored in system data storage 114. In some embodiments, method 200 may be performed in response to input received from an administrator or user of the visual query matching system 110.

At 210, the visual query matching system 110 may store first query data including queries associated with a first set of users. Each query may include criteria selected from multiple available query criteria and filter data for the query criteria. The first set of users may include any providers of goods, services and/or information.

As a first example, the visual query matching system 110 may include a transaction opportunities database storing opportunity data related to purchase and sale of corporations or business organizations. The first set of users may include sellers of the transaction opportunities.

The transaction opportunities database may be stored, for example, in system data storage 114 or external data storage 140. The database may include object data for multiple objects. Each object may be associated with a transaction opportunity and a seller of that transaction opportunity. The stored object data may correspond to multiple criteria for the objects. For example, the multiple criteria can include ten criteria including "Industry", "Country", "Revenue", "Seller Type", "Buyer Type", "Customer Type", "Years in Business", "FTE Count", "Stake Offered" and "Reason for Sale". In other example, the multiple criteria can include fewer or greater than ten criteria. The number of criteria is not intended to be a limitation. The stored object data can include values for each of the multiple criteria for each of the multiple objects.

Figure 3:
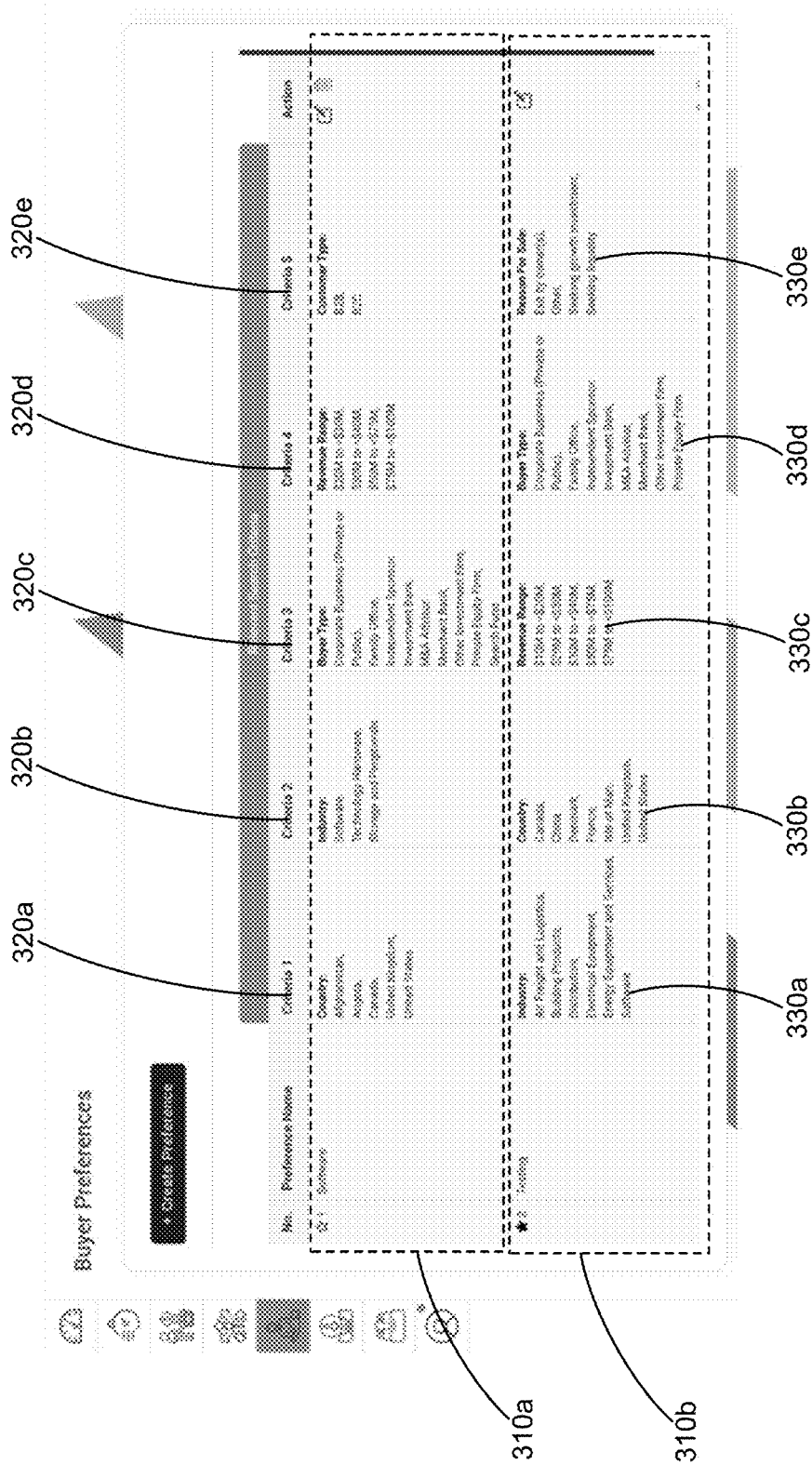
FIG. 3 is a screenshot of an example user interface displaying two queries associated with a user, in accordance with an example embodiment.

The visual query matching system 110 can receive one or more queries from a user of the first set of users (e.g., a seller of a transaction opportunity). For example, the queries may be regarding buyers for the transaction opportunity offered for sale. Each query may include filter data for the multiple criteria and a selection of one or more criteria from the multiple criteria. For example, FIG. 3 shows example screenshots of a user interface provided on the user device 120 displaying two queries 310a and 310b associated with a user. The queries 310a and 310b include a selection of five criteria 320a-320e from the ten available criteria. In other examples, the queries may include a selection of fewer or greater than five criteria. Each query 310 can include filter data for the selected criteria. For example, query 310b can include filter data 330a-330e for selected criteria 320a-320e respectively.

As another example, the visual query matching system 110 may include a research publication database and the first set of users may include authors of the research publications. The database may be stored, for example, in system data storage 114 or external data storage 140. The database may include object data for multiple objects. Each object may be associated with a research publication and a user (an author in this example) from the first set of users. The stored object data may correspond to multiple criteria for the objects. For example, the multiple criteria can include "Title", "Authors", "Publication Date", "Affiliated Institution", "Key Words", "Citation" etc. The user may provide one or more queries, for example, queries for other research publications in the same research area. The query may include one or more criteria selected from the multiple criteria and filter data for the query criteria. For example, the user may be interested in research publications from the year 2021 that include a "nanotechnology" key word. Accordingly, the query may include the selected criteria of "Publication Date" and "Key Words" including corresponding filter data of "Jan. 1, 2021-Dec. 31, 2021" and "nanotechnology" respectively.

At 220, the visual query matching system 110 may store second query data including metadata and queries associated with a second set of users. Each query may include criteria selected from multiple available query criteria and filter data for the query criteria.

The second set of users may include any consumers of goods, services and/or information. Referring first to the above-described example of a visual query matching system 110 that includes a transaction opportunities database, the second set of users may include buyers of the transaction opportunities.

Figure 4:
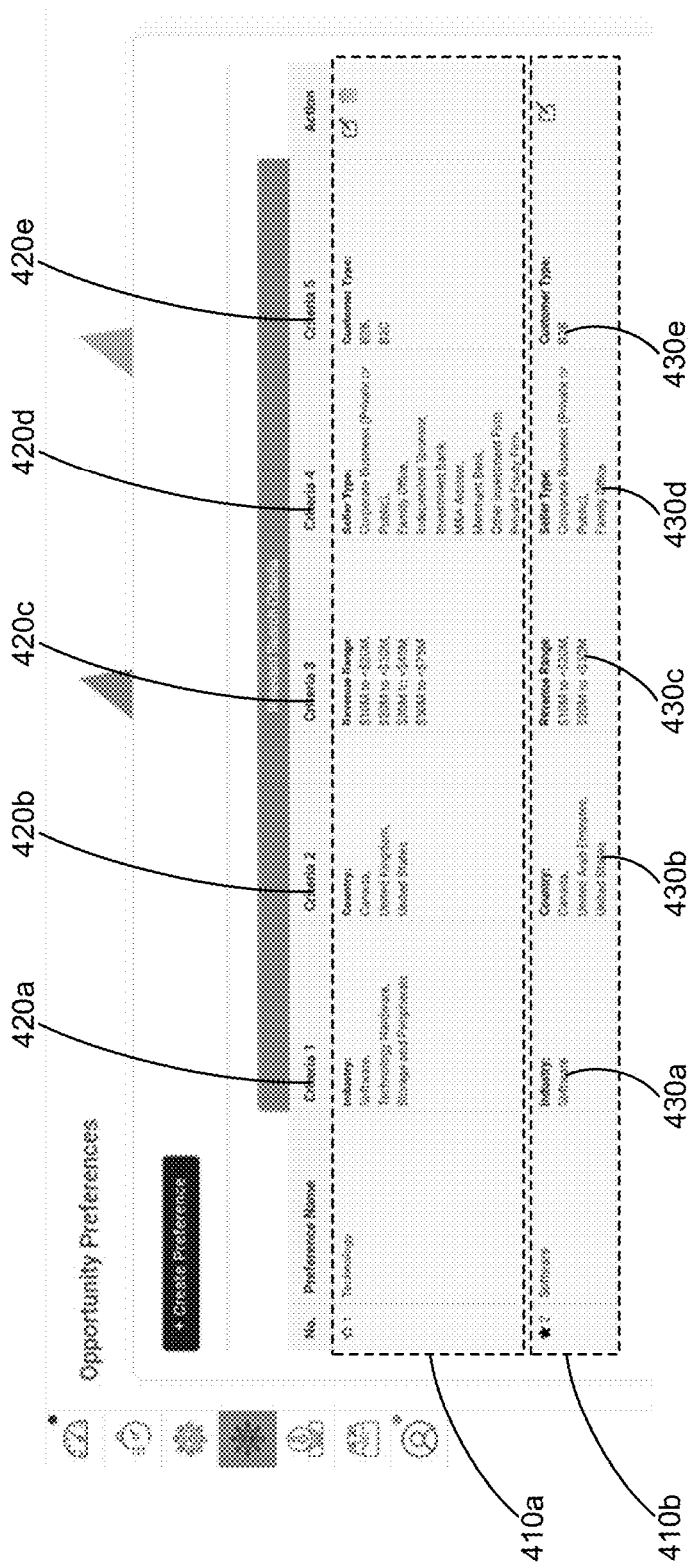
FIG. 4 is a screenshot of another example user interface displaying two queries associated with a user, in accordance with another example embodiment.

The visual query matching system 110 can receive one or more queries from a user of the second set of users (e.g., a buyer of a transaction opportunity). For example, the queries can be regarding transaction opportunities offered for sale. Each query may include filter data for the multiple criteria associated with the transaction opportunities (for example, the ten criteria described herein above) and a selection of one or more criteria from the multiple criteria. For example, FIG. 4 shows example screenshot of a user interface provided on the user device 120 displaying two queries 410a and 410b associated with a user. The queries 410a and 410b include a selection of five criteria 420a-420e from the ten available criteria. Each query 410 can include filter data for the selected criteria. For example, query 410b can include filter data 430a-430e for selected criteria 420a-420e respectively. The second query data may also include metadata associated with the second set of users. For example, the second query data may include an inactivity time that is associated with each buyer of the second set of users.

Referring next to the above-described example of a visual query matching system 110 that includes a research publication database, the second set of users may include readers of the research publications. The readers may provide one or more queries, for example, queries for research publications of interest. The query may include one or more criteria selected from the multiple criteria and filter data for the query criteria. For example, the reader may be interested in research publications by authors named "Jane Doe" and include a "nanotechnology" key word. Accordingly, the query may include the selected criteria of "Author" and "Key Words" including corresponding filter data of "Jane Doe" and "nanotechnology" respectively.

At 230, the visual query matching system 110 may determine matching users from the second set of users for a first user of the first set of users by comparing the first filter data for the selected criteria of a first query associated with the first user, with the metadata and the second filter data included in the second query data.

Referring to the above-described example of a visual query matching system 110 that includes a transaction opportunities database, Table 1 provides an example scenario of Query 1 associated with a first user (a seller) of the first set of users and Queries 2 and 3 associated with users (buyers) from the second set of users. Each of Queries 1-3 may include filter data for five criteria selected from multiple available criteria. In this example scenario, visual query matching system may determine the number of matching criteria as 5/5 between Query 1 and Query 2, and the number of matching criteria as 3/5 between Query 1 and Query 3. In some embodiments, visual query matching system 110 may designate a criterion as a matching criterion if there is a match for any of the filter data provided for that criterion. Criterion 2 can be designated as matching criterion between Query 1 and Query 2 because there is match for at least one of the filter data ("Investment Bank"). In this example scenario, Query 1 and Query 3 may have 3/5 matching criteria because there is no matching filter data between the queries for Criterion 2 and Criterion 4. Visual query matching system 110 may determine the buyers corresponding to Query 2 and Query 3 as matching users for the seller corresponding to Query 1 because they include at least one matching criterion. If there are no matching criterion between a query corresponding to a buyer and Query 1 corresponding to the seller, then that buyer may be determined to not be a matching user.

TABLE 1

Example queries provided by a first user of the first set of users and users from second set of users

|  | Criterion 1 | Criterion 2 | Criterion 3 | Criterion 4 | Criterion 5 | Matching Criteria |
|---|---|---|---|---|---|---|
| Query 1 | Country: Canada, US, UK, India | Seller Type: Independent Sponsor, Investment Bank, Investor | Customer Type: B2B B2C | Years in Business: >5 years, 10-15 years, >20 years | FTE Count: >20, 20-50, >250 |  |
| Query 2 | Country: Canada, India, China | Seller Type: Investment Bank | Customer Type: B2B | Years in Business: 10-15 years, >20 years | FTE Count: <40, 80-120, >250 | 5/5 |
| Query 3 | Country: China, US | Seller Type: M&A Advisor | Customer Type: B2B, B2C | Years in Business: <5 years | FTE Count: <20, 20-50, >250 | 3/5 |

In some embodiments, the filter data for the query criteria may include key words. Visual query matching system 110 can determine a matching criterion between two queries if they include matching key words. In some embodiments, at least one of the criteria used for determining matching users includes the "Buyer Type" criterion.

In some embodiments, the second query data may include metadata associated with users of the second set of users. The metadata may be stored in, for example, system data storage 114. The metadata may include, for example, an inactivity time associated with each user. For example, the inactivity time may correspond to the amount of time since the last time the user logged into visual query matching system 110. In some embodiments, users with inactivity time larger than a threshold time setting may not be displayed as matching users. The threshold time setting may be, for example, 180 days. In other examples, the threshold time setting may be larger or smaller than 180 days. The threshold time setting can be a global setting for the entire visual query matching system 110. In some embodiments, visual query matching system 110 may enable a given user to modify the threshold time setting to customize the matching users displayed to the given user.

At 240, the visual query matching system 110 may provide to the first user, a dashboard display including a matrix of the matching users. The matrix may be organized by a number of matching criteria among the selected criteria of the first query for each matching user.

Figure 5:
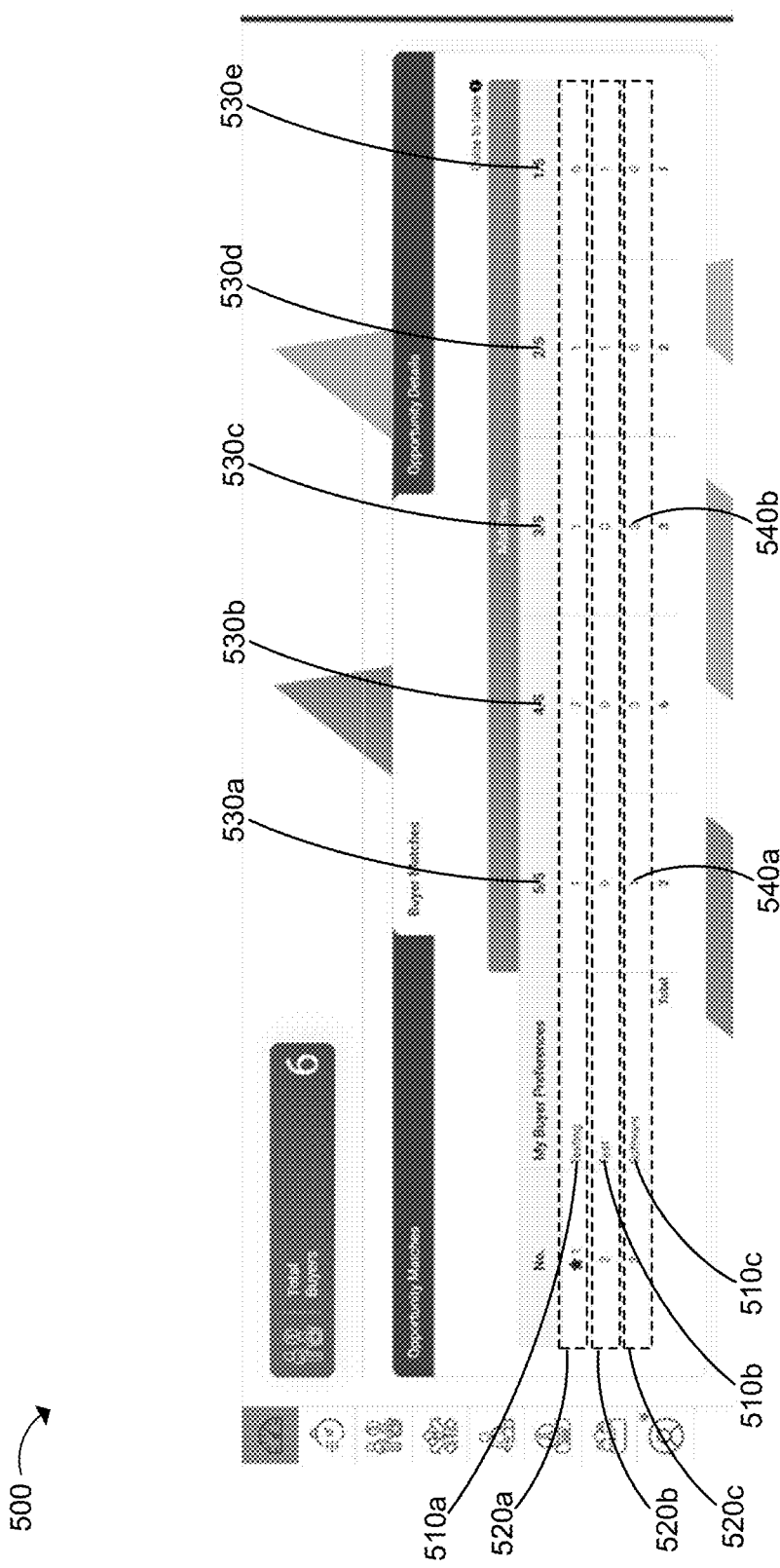
FIG. 5 is a screenshot of an example dashboard display provided to a user, in accordance with an example embodiment.

Referring now to FIG. 5, shown therein is an example screenshot of an example dashboard display 500 provided to a first user on the user device 120. Referring to the above-described example of a visual query matching system 110 that includes a transaction opportunities database, the first user can be a seller of transaction opportunities. The transaction opportunities database may include multiple queries 510*a*-510*c* associated with the first user. The visual query matching system 110 can determine (e.g., at step 230 of method 200) matching users from the second set of users for each of the queries 510*a*-510*c*.

Dashboard display 500 can include a matrix of the matching users displayed in a table form. Each of the rows 520*a*-520*c* can display the matching users corresponding to each of the queries 510*a*-510*c* respectively. The number of columns of the table may correspond to the number of selected criteria for queries 510*a*-510*c*. The matching users may be displayed in the columns corresponding to the number of matching criteria among the selected criteria for that query. For the example scenario described with reference to Table 1 above, if query 510*c* corresponds to Query 1, the matching user corresponding to Query 2 can be displayed in cell 540*a* (5/5 matching criteria) and the matching user corresponding to Query 3 can be displayed in cell 540*b*.

In some embodiments, the matrix of the matching users can be interactive. For example, the visual query matching system 110 can receive from the first user a user input to drill down into the matching users for any of the cells (e.g., cell 540*a*) and to request all the matching users corresponding to that cell (e.g., for cell 540*a*, the matching users corresponding to 5/5 matching criteria for query 510*c*). The visual query matching system 110 can receive from first user a further user input to request for details of the matching user.

In some embodiments, the visual query matching system 110 may provide a communication interface to the first user to enable communication with a matching user of interest. The visual query matching system 110 may also include a user status (e.g., a subscription status) associated with each user. The user status may be stored in system data storage 114. In some embodiments, the visual query matching system 110 may only provide the communication interface to users with an active user status.

In some embodiments, the visual query matching system 110 may determine whether the matching users is different in response to detecting a change in one or more of the first query data and the second query data. For example, the visual query matching system 110 can determine there is a change in the first query data corresponding to a change in filter data for one of the selected criteria. The change in the filter data may cause a change in the matching users determined at step 230 of method 200. In response to determining that the matching users is different, the visual query matching system 110 may update the dashboard display 500 to indicate that the matching users has changed. For example, the number of matching users in cell 540*b* may be changed from "2" to "3".

As another example, the visual query matching system 110 can determine there is a change in the second query data corresponding to a deletion of a user from the second set of users. If the deleted user was one of the matching users determined at step 230, the visual query matching system 110 may update the dashboard display 500 to indicate that the matching users has changed. For example, the number of matching users in cell 540*b* may be changed from "2" to "1" and/or addition of an annotation visually indicating a change occurred.

As another example, there may be a change in the second query data corresponding to a new user added to the second set of users. In response, the visual query matching system 110 may update the stored second query data (at step 220 of method 200) with new metadata and new queries associated with the new user. If the new user is included in the matching users determined at step 230, the visual query matching system 110 may update the dashboard display 500 to indicate that the matching users has changed by displaying a new user indicator on the dashboard display to indicate that the matching users includes a new matching user (not previously viewed by the first user). In some embodiments, the new user indicator may include, but not limited to, an annotation in the corresponding matrix cell, such as a coloured annotation. For example, if the new user is included in the matching users in cell 540*b*, the number of matching users may be changed from "2" to "3" and a red dot annotation may be included in cell 540*b* to indicate the new matching user. The visual query matching system 110 can receive a request from the first user to view the details of the new user by interacting with the dashboard display 500 as described herein. In some embodiments, the visual query matching system 110 may remove the annotation after the first user views the details of the new user.

In some embodiments, the visual query matching system 110 may determine matching queries among the queries associated with the second set of users by comparing the object data for objects associated with a first user of the first set of users with the second filter data for the selected criteria of the queries associated with the second set of users.

Referring to the above-described example of a visual query matching system 110 that includes a transaction opportunities database, the object data may include data for the multiple criteria for each transaction opportunity associated with a seller. There may be multiple transaction opportunities associated with a seller. For an example scenario including ten criteria for each transaction opportunity, the object data may include data for all ten criteria for each transaction opportunity. It will be understood that any number of criteria can apply.

In some embodiments, the object data may include a time of creation for each object and visual query matching system 110 may not include objects older than a threshold time setting in the matching process. For example, the threshold time setting may be 90 days and the visual query matching system 110 may not include any transaction opportunities older than 90 days in the matching process.

The visual query matching system 110 may determine matching queries by comparing the filter data for the selected criteria of each query (e.g., five criteria may be selected out of ten) with the object data for the corresponding criteria of that object. The comparison and the number of matching criteria may be determined as described herein above for determining matching users.

The visual query matching system 110 may provide to the first user, a dashboard display including a matrix of the matching queries. The matrix may be organized by a number of matching criteria among the selected criteria of the matching queries.

Figure 6:
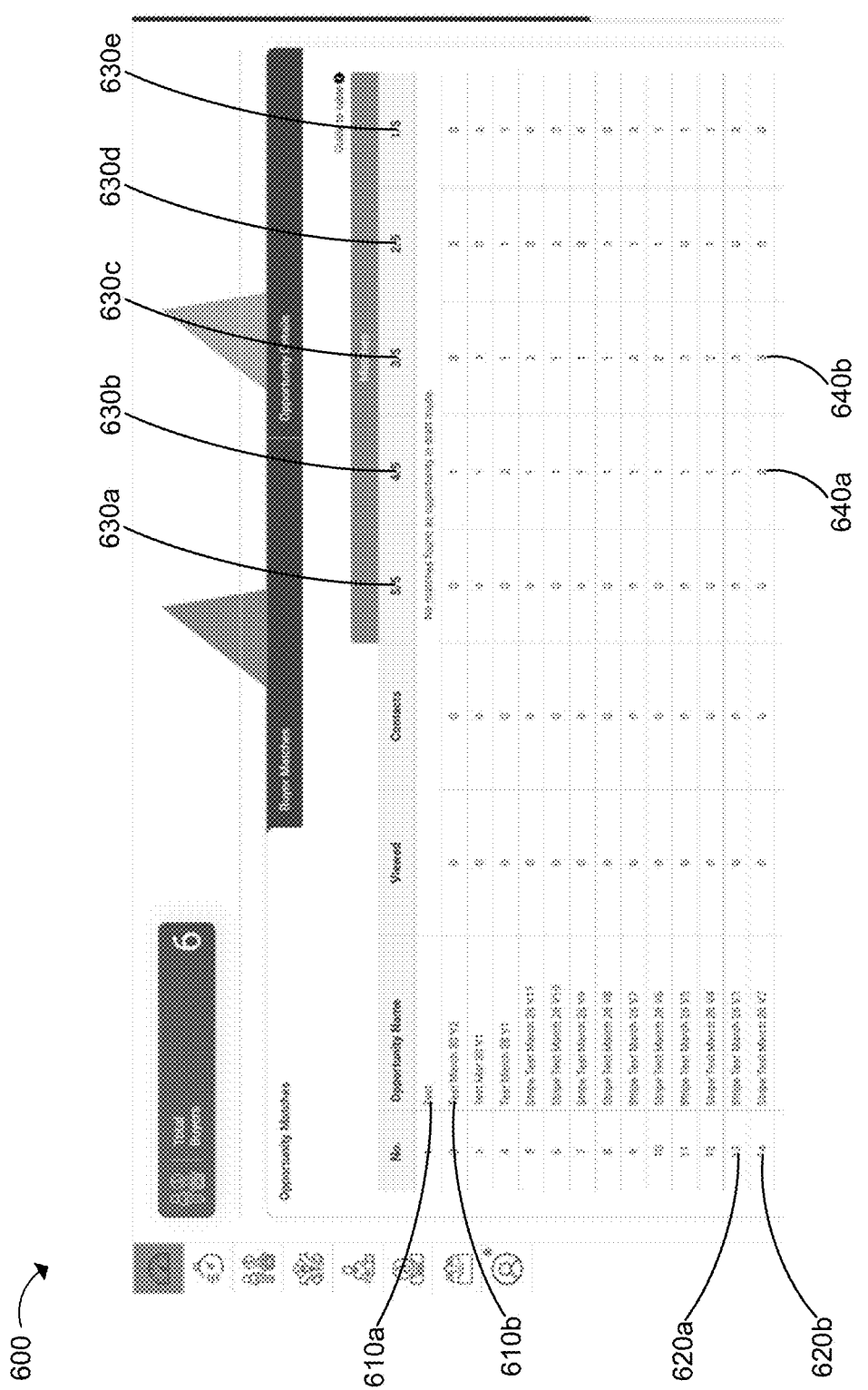
FIG. 6 is a screenshot of another example dashboard display provided to a user, in accordance with another example embodiment.

Referring now to FIG. 6, shown therein is an example screenshot of an example dashboard display 600 provided to a first user on the user device 120. Referring to the above-described example of a visual query matching system 110 that includes a transaction opportunities database, the first user can be a seller of transaction opportunities. The transaction opportunities database may include multiple objects (e.g., 610*a*, 610*b*) associated with the first seller. The visual query matching system 110 can determine matching queries associated with the second set of users (e.g., buyers) for each of the objects 610.

Dashboard display 600 can include a matrix of the matching queries displayed in a table form. Each of the rows (e.g., 620*a*, 620*b*) can display the matching queries corresponding to each of the objects (e.g., 610*a*, 610*b*). The number of columns of the table may correspond to the number of selected criteria for the matching queries. The matching queries may be displayed in the columns of the table ordered according to the number of matching criteria among the selected criteria of the matching queries. For example, cell 640*a* indicates two matching queries with 4/5 matching criteria for object in row 620*b*. Cell 640*b* indicates three matching queries with 3/5 matching criteria for the object in row 620*b*.

In some embodiments, the matrix of the matching users can be interactive. For example, the visual query matching system 110 can receive a user input from the first user requesting to drill down into the matching queries any of the cells (e.g., cell 640*a*) and to view all the matching users corresponding to that cell (e.g., for cell 640*a*, the matching buyers corresponding to the two matching queries). The visual query matching system 110 can receive a further user input requesting to view the details of the matching user.

In some embodiments, the visual query matching system 110 may determine whether the matching queries is different in response to detecting a change in one or more of the first query data, the second query data and the object data. For example, there may be a change in the first query data corresponding to a change in filter data for one of the selected criteria. The change in the filter data may cause a change in the matching queries. In response to determining that the matching queries is different, the visual query matching system 110 may update the dashboard display 600 to indicate that the matching queries has changed. For example, the number of matching queries in cell 640*b* may be changed from "3" to "4".

As another example, there may be a change in the second query data corresponding to a new user added to the second set of users. In response, the visual query matching system 110 may update the stored second query data with new metadata and new queries associated with the new user. If a query associated with the new user is included in the matching queries, the visual query matching system 110 may update the dashboard display 600 to indicate that the matching queries has changed by displaying a new user indicator on the dashboard display to indicate that the matching queries include a query corresponding to a new user (not previously viewed by the first user). In some embodiments, the new user indicator may include an annotation in the corresponding matrix cell. The first user may view the details of the new user by interacting with the dashboard display 600. In some embodiments, the visual query matching system 110 can remove the annotation after the first user views the details of the new user.

In some embodiments, the second query data may include multiple queries associated with a single user for one or more users of the second set of users and any one query of the multiple queries is designated as a primary query for each of the second set of users. For example, the second set of users may include multiple buyers and the second query data may include multiple queries associated with a single buyer. At least one of the multiple queries associated with a single buyer may be designed as a primary query for that buyer. While implementing process 200, the visual query matching system 110 may determine matching users from the second set of users for a first user of the first set of users by comparing the first filter data for the selected criteria of the first query associated with the first user, with the metadata, and the second filter data of the primary query for each of the second set of users. The visual query matching system 110 may not perform comparisons with the second filter data of the non-primary queries when determining the matching users.

Figure 7:
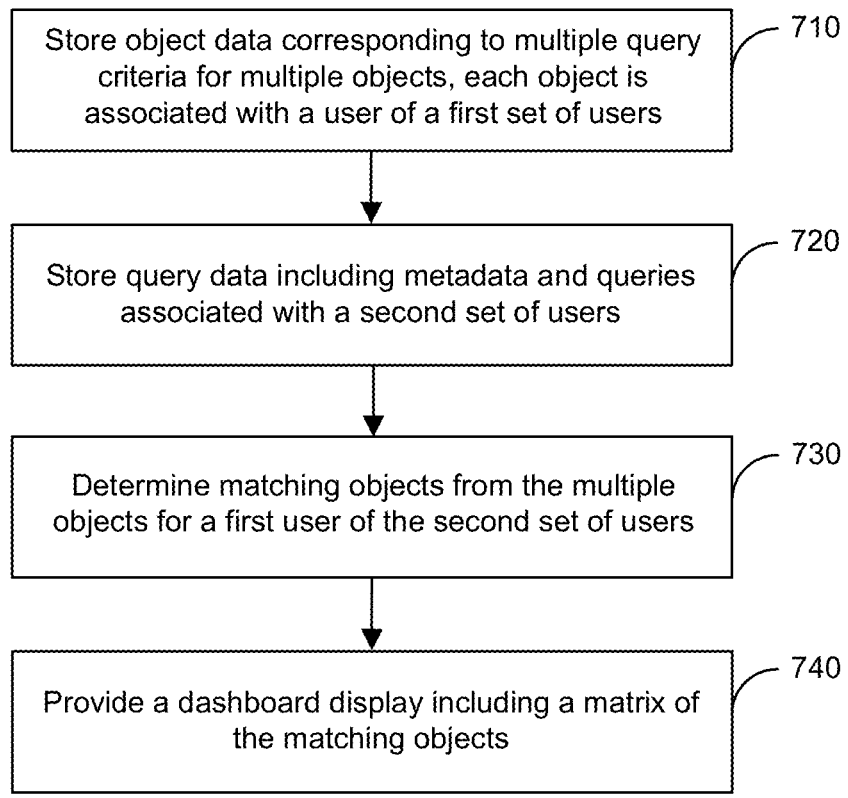
FIG. 7 is a flowchart illustrating the steps of another example method of visual query matching, in accordance with another example embodiment.

Referring to FIG. 7, shown is a flowchart illustrating the steps of a method of visual query matching, shown generally as 700. Method 700 can be implemented using, for example, visual query matching system 110 shown in FIG. 1. To illustrate the steps of the method, reference will be made simultaneously to block diagram 100 and FIGS. 4, 8 and 9 which illustrate various example screenshots of a user interface provided on user devices 120.

Method 700 may be performed at various times. For example, method 700 may be continuously performed by the visual query matching system 110. In other examples, method 700 may be performed according to a schedule stored in system data storage 114. In some embodiments, method 700 may be performed in response to input received from an administrator or user of the visual query matching system 110.

At 710, the visual query matching system 110 may store object data corresponding to multiple query criteria for multiple objects, wherein each of the multiple objects is associated with a user of a first set of users. The first set of users may include any providers of goods, services and/or information. In some embodiments, multiple objects may be associated with a single user of the first set of users.

As a first example, the visual query matching system 110 may include a transaction opportunities database storing opportunity data related to purchase and sale of corporations or business organizations. The first set of users may include sellers of the transaction opportunities.

The transaction opportunities database may be stored, for example, in system data storage 114 or external data storage 140. The database may include object data for multiple objects. Each object may be associated with a transaction opportunity and a seller of that transaction opportunity. The stored object data may correspond to multiple criteria for the objects. The multiple criteria may be based on properties associated with the multiple objects. For example, the multiple criteria can include ten criteria including "Industry", "Country", "Revenue", "Seller Type", "Buyer Type", "Customer Type", "Years in Business", "FTE Count", "Stake Offered" and "Reason for Sale". In other example, the multiple criteria can include fewer or greater than ten criteria. The stored object data can include values for each of the multiple criteria for each of the multiple objects.

At 720, the visual query matching system 110 may store second query data including metadata and queries associated with a second set of users. Each query may include criteria selected from multiple available query criteria and filter data for the query criteria.

The second set of users may include any consumers of goods, services and/or information. Referring to the above-described example of a visual query matching system 110 that includes a transaction opportunities database, the second set of users may include buyers of the transaction opportunities.

The visual query matching system 110 can receive one or more queries from a user of the second set of users (e.g., a buyer of a transaction opportunity). The queries can be regarding transaction opportunities offered for sale. As described herein above with reference to FIG. 4, each query may include filter data for the multiple criteria associated with the transaction opportunities (for example, the ten criteria described herein above) and a selection of one or more criteria from the multiple criteria.

At 730, the visual query matching system 110 may determine matching objects from the multiple objects for a first user of the second set of users by comparing the first filter data for the selected criteria of a first query associated with the first user and the object data for the multiple objects. Referring to the above-described example of a visual query matching system 110 that includes a transaction opportunities database, the visual query matching system 110 may determine matching objects by comparing the filter data for the selected criteria of a first query associated with a first buyer with the object data for corresponding criteria for each of the multiple objects.

At 740, the visual query matching system 110 may provide to the first user, a dashboard display including a matrix of the matching objects. The matrix may be organized by a number of matching criteria among the selected criteria of the first query for each matching object.

Figure 8:
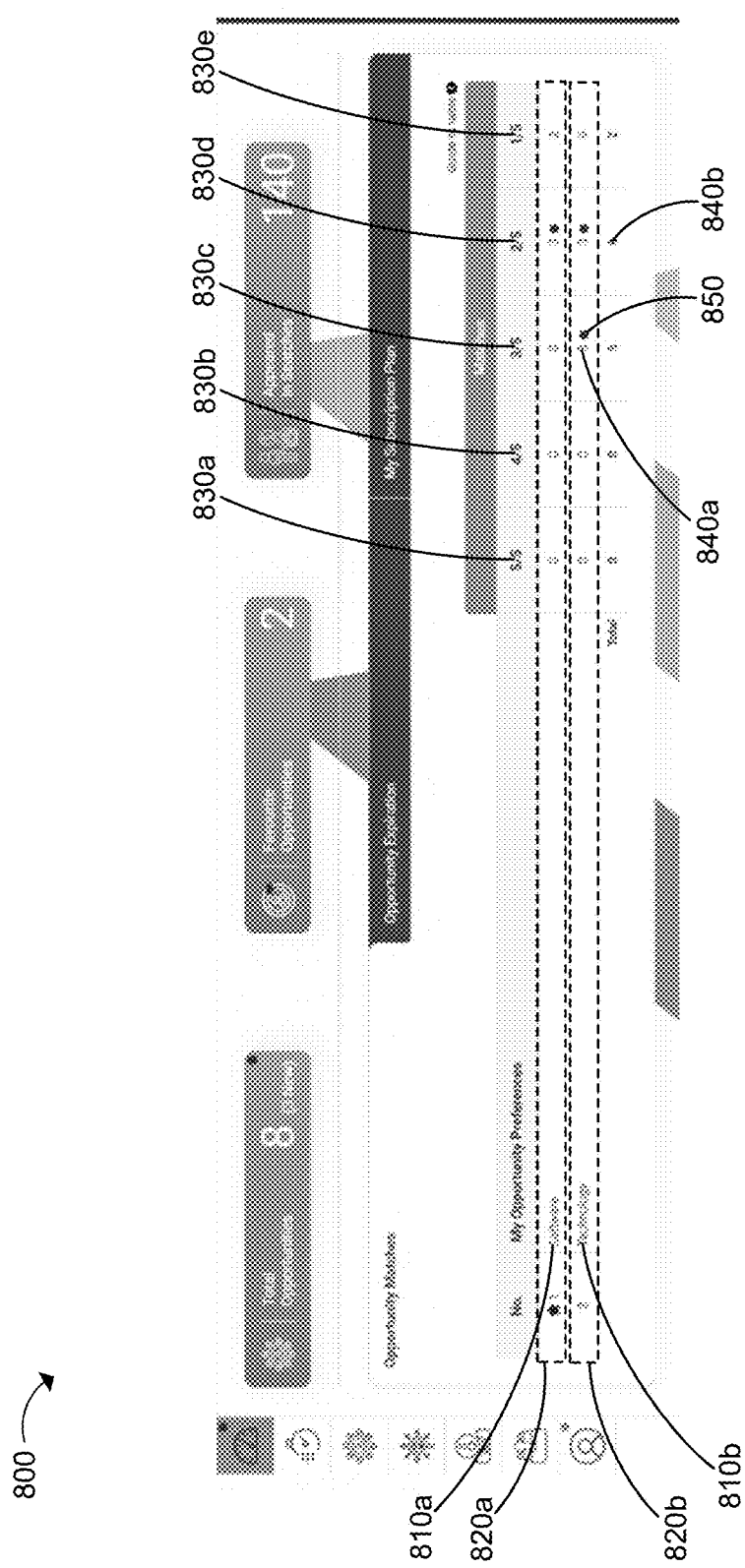
FIG. 8 is a screenshot of another example dashboard display provided to a user, in accordance with another example embodiment.

Referring now to FIG. 8, shown therein is an example screenshot of an example dashboard display 800 provided to a first user on the user device 120. Referring to the above-described example of a visual query matching system 110 that includes a transaction opportunities database, the first user can be a buyer of transaction opportunities. The transaction opportunities database may include multiple queries (e.g., 810a and 8120b) associated with the buyer. The visual query matching system 110 can determine (e.g., at step 730 of method 700) matching objects from the multiple objects for each of the queries 810.

Dashboard display 800 can include a matrix of the matching objects displayed in a table form. Each of the rows (e.g., 820a and 820b) can display the matching objects corresponding to each of the queries 810. The number of columns of the table may correspond to the number of selected criteria for queries 810. The matching objects may be displayed in the columns 830a-830e corresponding to the number of matching criteria among the selected criteria for that query.

In some embodiments, the matrix of the matching users can be interactive. For example, the visual query matching system 110 can receive a user input from the first user to drill down into the matching objects for any of the cells (e.g., cell 840a or cell 840b) and to request all the matching objects corresponding to that cell (e.g., for cell 840a, the matching objects corresponding to 3/5 matching criteria for query 810b). The visual query matching system 110 can also receive a further user input from the first user requesting to view the details of the matching object.

In some embodiments, the visual query matching system 110 may provide a communication interface to the first user to enable communication with a user associated with the matching object. The visual query matching system 110 may also include a user status (e.g., a subscription status) associated with each user. The user status may be stored in system data storage 114. In some embodiments, the visual query matching system 110 may only provide the communication interface to users with an active user status.

In some embodiments, the visual query matching system 110 may determine whether the matching objects is different in response to detecting a change in one or more of the second query data and the object data. For example, there may be a change in the second query data corresponding to a change in filter data for one of the selected criteria. The change in the filter data may cause a change in the matching objects determined at step 730 of method 700. In response to determining that the matching objects is different, the visual query matching system 110 may update the dashboard display 800 to indicate that the matching objects has changed. For example, the number of matching objects in cell 840b may be changed from "6" to "7".

As another example, the visual query matching system 110 can determine there is a change in the object data corresponding to a deletion of an object from among the multiple objects. If the deleted objects was one of the matching objects determined at step 730, the visual query matching system 110 may update the dashboard display 800 to indicate that the matching objects has changed. For example, the number of matching objects in cell 840b may be changed from "6" to "5" and/or an annotation to visually indicate a change occurred.

As another example, a user may be deleted from the first set of users. If one or more objects were associated with the deleted user, there may be a change in the object data corresponding to a deletion of the one or more objects associated with the deleted user. If the deleted one or more objects were included in the matching objects determined at step 730, the visual query matching system 110 may update the dashboard display 800 to indicate that the matching objects has changed. For example, if the matching objects displayed in cell 840b included three objects associated with the deleted user, the number of matching objects in cell 840b may be changed from "6" to "3" and/or an annotation to visually indicate a change occurred.

As another example, there may be a change in the object data corresponding to a new object added to the multiple objects. In response, the visual query matching system 110 may update the stored second object data with new data associated with the new object.

If the new object is included in the matching objects determined at step 730, the visual query matching system 110 may update the dashboard display 800 to indicate that the matching objects has changed by displaying a new object indicator on the dashboard display to indicate that the matching objects includes a new matching object (not previously viewed by the first user). In some embodiments, the new object indicator may be an annotation in the corresponding matrix cell. For example, if the new object is included in the matching objects in cell 840a, the number of matching objects may be changed from "5" to "6" and a red dot annotation 850 may be included in cell 840a to indicate the new matching object. The first user may view the details of the new object by interacting with the dashboard display 800 as described herein above. In some embodiments, the visual query matching system 110 may remove the annotation 850 after the first user views the details of the new object.

In some embodiments, the object data may include a time of creation for each object and visual query matching system 110 may not include objects older than a threshold time setting in the matching process. For example, the threshold time setting may be 90 days and the visual query matching system 110 may not include any transaction opportunities older than 90 days in the matching process.

In some embodiments, the visual query matching system 110 may determine a time to expiration for each of the objects. For example, the visual query matching system 110 may determine the time to expiration for a given object using the current time and a time of creation for the given object. Visual query matching system 110 may provide a dashboard display where the matrix of the objects include ordering according to the timing parameter.

Figure 9:
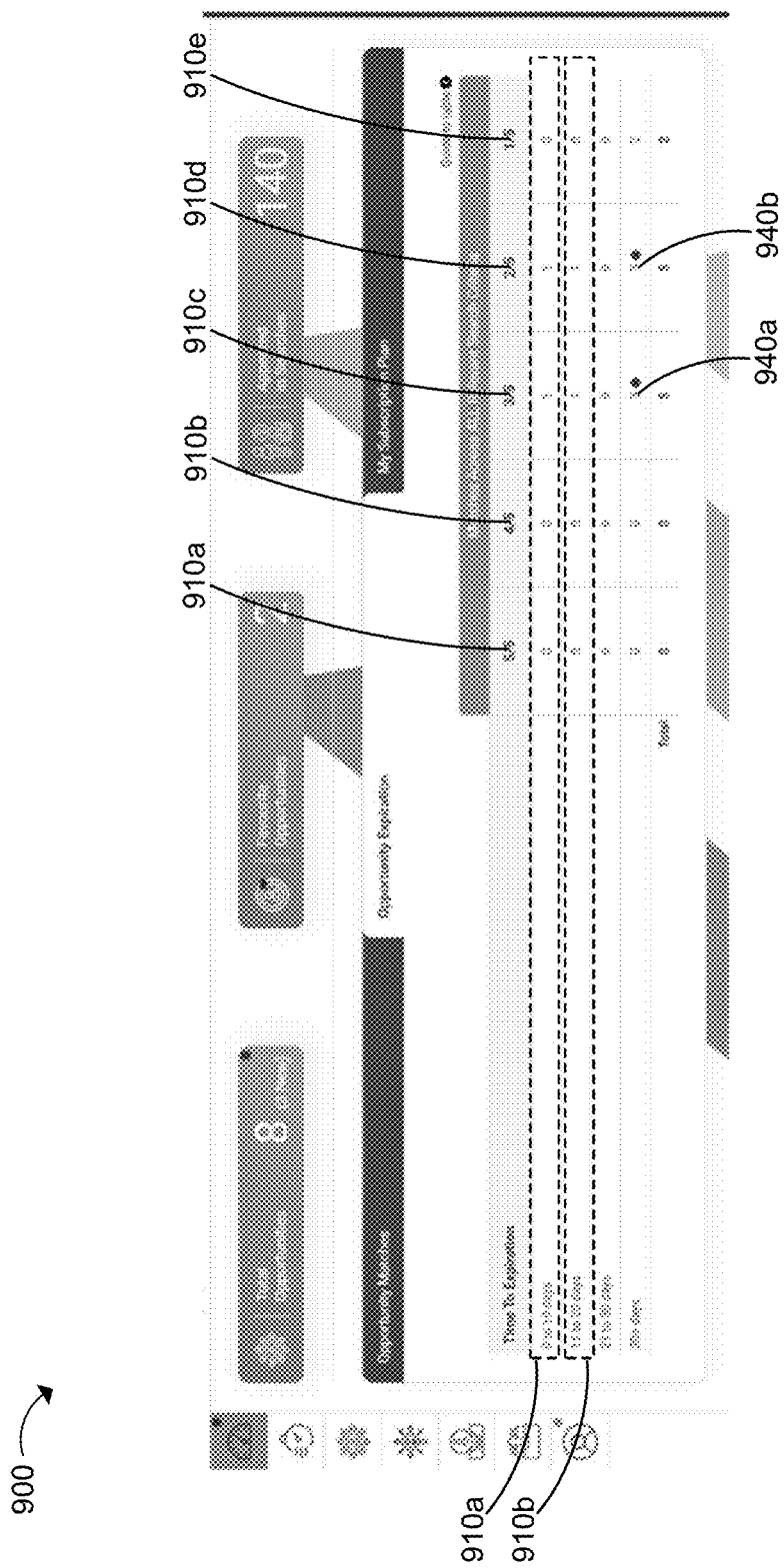
FIG. 9 is a screenshot of another example dashboard display provided to a user, in accordance with another example embodiment.

Referring now to FIG. 9, shown therein is an example screenshot of an example dashboard display 900 provided to a first user on the user device 120. Dashboard display 900 can include a matrix of the matching objects displayed in a table form. Each of the rows (e.g., 910*a* and 910*b*) can display the matching objects placed in the table with the rows of the table ordered according to the time to expiration. The number of columns of the table may correspond to the number of selected criteria for the queries. The matching objects may be displayed in the columns 920*a*-920*e* corresponding to the number of matching criteria among the selected criteria for that query.

In some embodiments, the matrix of the matching users can be interactive. For example, the visual query matching system 110 can receive a user input from the first user requesting to drill down into the matching objects for any of the cells (e.g., cell 940*a* or cell 940*b*) and to view all the matching objects corresponding to that cell (e.g., for cell 940*a*, the matching objects corresponding to 3/5 matching criteria and a time to expiration of 21 to 30 days). The visual query matching system 110 can then receive a further user input from the first user requesting to view the details of the matching object.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor (e.g., a microprocessor), a data storage system (including volatile and non-volatile memory and/or storage elements), at least one input device, and at least one output device. For example and without limitation, the programmable computers (referred to herein as computing devices) may be a personal computer, laptop, personal data assistant, cellular telephone, smart-phone device, tablet computer, and/or wireless device. Program code is applied to input data to perform the functions described herein and generate output information. The output information is applied to one or more output devices, in known fashion.

Each program is preferably implemented in a high-level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various modification and variations may be made to these exemplary embodiments without departing from the spirit and scope of the invention, which is limited only by the appended claims. For example, the steps of a method in accordance with any of the embodiments described herein may be performed in any order, whether or not such steps are described in the claims, figures or otherwise in any sequential numbered or lettered manner. Also, in the various user interfaces illustrated in the figures, it will be understood that the illustrated user interface text and controls are provided as examples only and are not meant to be limiting. Other suitable user interface elements may be possible.

I claim:

1. A computer-implemented visual query matching method comprising:
    storing first query data comprising queries associated with a first set of users, wherein each query includes selected criteria from multiple query criteria and first filter data for the multiple query criteria;
    storing second query data comprising metadata and queries associated with a second set of users, wherein each query includes selected criteria from the multiple query criteria and second filter data for the multiple query criteria;
    storing object data corresponding to the multiple criteria for a first object associated with a first user of the first set of users;
    determining, by a processor, matching queries among the queries associated with the second set of users by comparing the object data for the first object with the second filter data for the selected criteria of the queries associated with the second set of users; and
    providing, by the processor to the first user, a dashboard display comprising a matrix of the matching queries, the matrix organized by a number of matching criteria among the selected criteria of the matching queries.

2. The method of claim 1 further comprising:
    determining, by the processor, matching users from the second set of users for the first user by comparing the first filter data for the selected criteria of a first query associated with the first user, with the metadata and the second filter data included in the second query data.

3. The method of claim 2, wherein:
    the second query data comprises multiple queries associated with a single user for one or more users of the second set of users, wherein any one query of the multiple queries is designated as a primary query for each of the second set of users; and
    the processor determines matching users from the second set of users for the first user by comparing the first filter data for the selected criteria of the first query associated with the first user, with the metadata, and the second filter data of the primary query for each of the second set of users.

4. The method of claim 2, further comprising:
determining, by the processor, whether the matching users is different in response to detecting a change in one or more of the first query data and the second query data; and
in response to determining the matching users is different, operating the processor to update the dashboard display to indicate the matching users has changed.

5. The method of claim 4, wherein the change in one or more of the first query data and the second query data comprises a new user added to the second set of users, and the method further comprising:
updating the second query data with new metadata and new queries associated with the new user; and
operating the processor to update the dashboard display to indicate the matching users has changed comprises displaying a new user indicator on the dashboard display to indicate that the matching users comprise a new matching user.

6. The method of claim 1, further comprising:
determining, by the processor, whether the matching queries is different in response to detecting a change in one or more of the first query data, the second query data, and the object data; and
in response to determining the matching queries is different, operating the processor to update the dashboard display to indicate the matching queries has changed.

7. The method of claim 2, wherein the method further comprises providing, by the processor, a communication interface between the first user and any of the matching users from the second set of users based on a user status of the first user.

8. The method of claim 1, wherein the dashboard display provided to the first user comprises the matrix of the matching queries displayed in a table, wherein each row of the table corresponds to an object associated with the first user and a number of columns of the table corresponds to a number of the selected criteria of the matching queries.

9. The method of claim 8, wherein the matching queries are displayed in the columns of the table ordered according to the number of matching criteria among the selected criteria of the matching queries.

10. A system for visual query matching, the system comprising:
a memory unit configured to:
store first query data comprising queries associated with a first set of users, wherein each query includes selected criteria from multiple query criteria and first filter data for the multiple query criteria;
store second query data comprising metadata and queries associated with a second set of users, wherein each query includes selected criteria from the multiple query criteria and second filter data for the multiple query criteria; and
store object data corresponding to the multiple criteria for a first object associated with a first user of the first set of users; and
a processor configured to:
determine matching queries among the queries associated with the second set of users by comparing the object data for the first object with the second filter data for the selected criteria of the queries associated with the second set of users; and
provide, to the first user, a dashboard display comprising a matrix of the matching queries, the matrix organized by a number of matching criteria among the selected criteria of the matching queries.

11. The system of claim 10, wherein the processor is further configured to:
determine matching users from the second set of users for the first user by comparing the first filter data for the selected criteria of a first query associated with the first user, with the metadata and the second filter data included in the second query data.

12. The system of claim 11, wherein:
the second query data comprises multiple queries associated with a single user for one or more users of the second set of users, wherein any one query of the multiple queries is designated as a primary query for each of the second set of users; and
the processor is configured to determine matching users from the second set of users for the first user by comparing the first filter data for the selected criteria of the first query associated with the first user, with the metadata, and the second filter data of the primary query for each of the second set of users.

13. The system of claim 11, wherein the processor is further configured to:
determine whether the matching users is different in response to detecting a change in one or more of the first query data and the second query data; and
in response to determining the matching users is different, update the dashboard display to indicate the matching users has changed.

14. The system of claim 13, wherein the change in one or more of the first query data and the second query data comprises a new user added to the second set of users, wherein the memory unit is further configured to store updated second query data that includes new metadata and new queries associated with the new user; and
the processor being configured to update the dashboard display to indicate the matching users has changed comprises displaying a new user indicator on the dashboard display to indicate that the matching users comprise a new matching user.

15. The system of claim 10, wherein the processor is further configured to:
determine whether the matching queries is different in response to detecting a change in one or more of the first query data, the second query data, and the object data; and
in response to determining the matching queries is different, update the dashboard display to indicate the matching queries has changed.

16. The system of claim 11, wherein the processor is further configured to provide a communication interface between the first user and any of the matching users from the second set of users based on a user status of the first user.

17. The system of claim 10, wherein the dashboard display provided to the first user comprises the matrix of the matching queries displayed in a table, wherein each row of the table corresponds to an object associated with the first user and a number of columns of the table corresponds to a number of the selected criteria of the matching queries.

18. The system of claim 17, wherein the matching queries are displayed in the columns of the table ordered according to the number of matching criteria among the selected criteria of the matching queries.

* * * * *